United States Patent [19]

Miyano et al.

[11] Patent Number: 5,673,467
[45] Date of Patent: Oct. 7, 1997

[54] MACHINE TOOL ASSEMBLY

[76] Inventors: Shigemori Steven Miyano; Toshiharu Miyano, both c/o Miyano Machinery USA Inc., 940 N. Central Ave., Wood Dale, Ill. 60191

[21] Appl. No.: 329,642

[22] Filed: Oct. 26, 1994

[51] Int. Cl.$^6$ ............... B23Q 5/04; B23B 3/00; G05B 11/18
[52] U.S. Cl. ............... 29/27 C; 82/110; 173/12; 408/129; 318/594
[58] Field of Search ............... 409/231; 483/54; 29/40, 27 C; 408/129, 16; 82/110, 145; 318/594, 49; 74/424.8 B; 60/53 R; 173/12, 163

[56] References Cited

U.S. PATENT DOCUMENTS

| | | | |
|---|---|---|---|
| 3,586,115 | 6/1971 | Amtsberg | 173/163 |
| 3,635,022 | 1/1972 | Lewis | 60/53 R |
| 3,872,738 | 3/1975 | Price et al. | 74/424.8 B |
| 3,878,742 | 4/1975 | Lahm | 82/110 |
| 3,922,936 | 12/1975 | Link | 82/145 X |
| 4,008,647 | 2/1977 | Hague et al. | 409/231 X |
| 4,057,881 | 11/1977 | Stephens | 29/27 C |
| 4,077,736 | 3/1978 | Hutchens | 408/16 |
| 4,084,482 | 4/1978 | Derrien | 409/231 |
| 4,124,327 | 11/1978 | Yoshida et al. | 409/231 X |
| 4,297,624 | 10/1981 | Komiya | 318/594 |
| 4,522,269 | 6/1985 | Adman et al. | 173/12 |
| 4,883,130 | 11/1989 | Dixon | 173/12 |
| 5,161,290 | 11/1992 | Hashimoto | 29/40 |
| 5,357,180 | 10/1994 | Speicher | 318/49 |

FOREIGN PATENT DOCUMENTS 2053507  2/1990  Japan ............... 409/231

*Primary Examiner*—William R. Briggs
*Attorney, Agent, or Firm*—Wood, Phillips, VanSanten, Clark & Mortimer

[57] ABSTRACT

A machine tool assembly having a rotatable element for driving a tool to operate on a workpiece and structure for driving the rotatable element in rotation. The driving structure has a first power source and first structure cooperating between the first power source and the rotatable tool driving element for selectively a) allowing the first power source to be operated at one speed to drive the rotatable tool driving element at a first operating speed with the machine tool assembly in a first state and b) allowing the power source to be operated at the one speed without rotating the rotatable tool driving element at the first operating speed with the machine tool assembly in a second state. Structure is provided for changing the machine tool assembly from one of its first and second states to the other of its first and second states.

19 Claims, 2 Drawing Sheets

FIG. I
(PRIOR ART)

MACHINE TOOL ASSEMBLY

BACKGROUND OF THE INVENTION

1. Field of the Invention

This invention relates to machine tools of the type having a rotatable spindle that carries a working tool and, more particularly, to a machine tool assembly that can be used to rapidly bring the machine tool spindle up to a predetermined operating speed.

2. Background Art

Machine tools are commonly designed with a rotary spindle with a chuck thereon to releasably hold a working tool. The spindle is driven by a vector motor, typically through one or more endless power transmission belts.

The vector motor is energized with the spindle and chuck initially at rest. On a typical numerically controlled lathe, it will take 3–5 seconds to bring the spindle and chuck up to an operating speed of 2,000 rpm. If a tooling/cutting operation is performed for 10 seconds, the total cycle time from startup to completion is 15 seconds. Reduction in the startup time can significantly reduce the total cycle time. For example, if the startup time could be reduced to one second, the total cycle time would be reduced by approximately 27%. In ongoing machining operations, this time reduction represents a significant economic advantage. Consequently, designers of machine tools strive to minimize this startup time.

It is known to increase the power output of the vector motor to effect a reduction in the startup time. To accomplish this, the vector motor, as well as an amplifier therefor, must be upscaled. The result is generally a more expensive overall system, assuming the other components remain the same.

Additionally, the higher output motor is more expensive to operate and is particularly inefficient when used in light machining operations.

SUMMARY OF THE INVENTION

In one form of the invention, a machine tool assembly is provided having a rotatable element for driving a tool to operate on a workpiece and structure for driving the rotatable element in rotation. The driving structure has a first power source and first structure cooperating between the first power source and the rotatable tool driving element for selectively a) allowing the first power source to be operated at one speed to drive the rotatable tool driving element at a first operating speed with the machine tool assembly in a first state and b) allowing the power source to be operated at the one speed without rotating the rotatable tool driving element at the first operating speed with the machine tool assembly in a second state. Structure is provided for changing the machine tool assembly from one of its first and second states to the other of its first and second states.

The driving structure may include a second power source and second structure cooperating between the second power source and the rotatable tool driving element for driving the rotatable tool driving element at a second operating speed with the machine tool assembly in at least one of its first and second states.

The first and second power sources may have different power output capacities.

The output from the two power sources can be combined for heavy machining operations. At the same time, one power source could be operated to the exclusion of the other. Consequently, the amount of driving power can be appropriately selected depending upon the machining operation to be performed.

Aside from the flexibility and operational efficiency that this system affords, it is generally less expensive to construct than is a machine with a single power source with a comparable power output.

The first cooperating structure may include a clutch assembly having engaged and disengaged states such that the clutch assembly is in the engaged state with the machine tool assembly in its first state and the clutch assembly is in its disengaged state with the machine tool assembly in its second state.

The driving structure may include a motor with a rotary shaft. The first cooperating structure may include a pulley on the rotary shaft and at least one power transmission belt for transmitting power from the pulley to the rotatable tool driving element. The first cooperating structure may selectively a) allow the first power source to be operated at the one speed without rotating the pulley and b) allow the first power source to be operated at the one speed to drive the pulley.

A fly wheel may be provided on the rotary shaft. The fly wheel provides additional momentum which thereby accounts for rapid velocity transfer between the rotary shaft on the first motor and the rotatable tool driving element.

The invention further contemplates the combination of the machine tool assembly with a working tool for operating on a workpiece, with structure cooperating between the working tool and rotatable tool driving element for rotating the working tool as an incident of the rotatable tool driving element being rotated. Control structure can be provided for operating the driving structure, with the control structure including structure for sensing the location of a workpiece in an operating position at a work station and for producing a signal indicative of a workpiece being in that position. The control structure includes structure responsive to the signal from the sensing structure for changing the machine tool from its second state into its first state.

The control structure may include structure responsive to the signal from the sensing structure for operating the second power source.

The rotatable tool driving element may be a spindle having a chuck for receiving a working tool.

The control structure may include structure for generating another signal indicative of a work piece at least one of a) moving into an operating position, and b) moving out of an operating position and structure responsive to the another signal for changing the machine tool from its first state into its second state.

The second power source has an operating state and a stopped state, with the control structure including structure responsive to the another signal for changing the second power source from its operating state to its stopped state.

In another form of the invention, a machine tool is provided having a rotatable element for driving a tool to operate on a workpiece and structure for driving the rotatable element in rotation. The driving structure has a first power source, structure cooperating between the first power source and the rotatable tool driving element for driving the rotatable tool driving element through the first power source at a first operating speed, a second power source, and second structure cooperating between the second power source and the rotatable tool driving element for driving the rotatable tool driving element through the second power source at a second operating speed. The first cooperating structure includes structure for selectively placing the machine tool assembly in a) a first state wherein the first power source operating at one speed drives the rotatable tool driving element at a first operating speed and b) a second state wherein the rotatable tool driving element is undriven by the first power source with the first power source operating at the one speed. Control structure is provided for selectively c) causing operation of the first power source at the one speed without causing operation of the second power source with the machine tool assembly in the second state and d) causing operation of both the first and second power sources with the machine tool assembly in the first state.

The rotatable tool driving element may be a rotatable shaft and the first and second cooperating structures each include first and second endless power transmission elements driven one each by the first and second power sources and each operatively connected to the rotatable shaft.

DETAILED DESCRIPTION OF THE DRAWINGS

Figure 1:
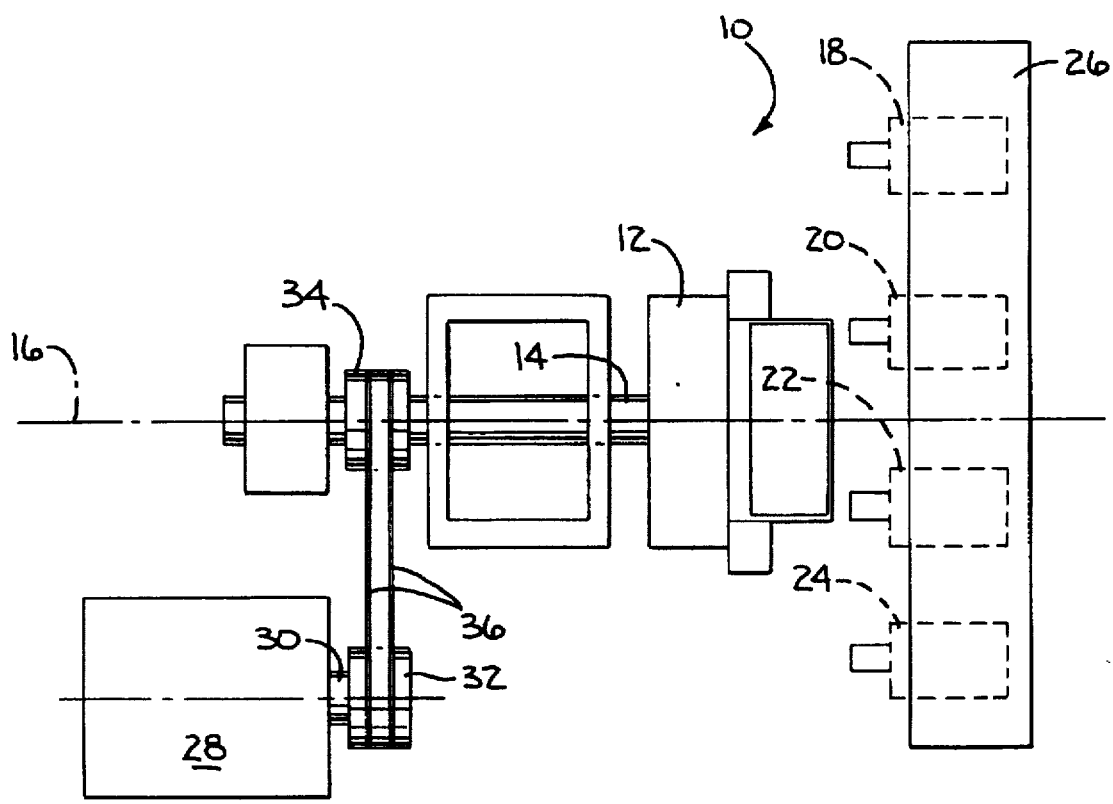
FIG. 1 is a schematic view of a prior art machine tool assembly.

In FIG. 1, a prior art machine tool assembly is shown at 10. The machine tool assembly 10 is part of a machine tool system that is used to perform any of a number of different machining operations on a workpiece. The machining operations are performed utilizing a chuck 12 that is carried on a spindle 14, with the chuck 12 and spindle 14 being rotatable about an axis 16. The chuck 12, which may be part of a lathe, a milling machine, or the like, rotates any of a number of different cutting tools 18, 20, 22, 24. The cutting tools 18, 20, 22, 24 are in this particular assembly shown to be carried on a slide 26. The tools can be either manually or automatically a) placed into operative position in the chuck 12 and removed from the operative position in the chuck 12. The particular mechanism for accomplishing this is peripheral to the present invention.

The spindle 14 and chuck 12 are driven in rotation about the axis 16 by a variable speed vector motor 28. The motor 28 has a rotatable shaft 30 with a pulley 32 at its distal end. The pulley 32 is aligned axially of the spindle with another pulley 34 carried by, and rotatable with, the spindle 14. Two endless power transmission elements 36 are trained around the pulleys 32, 34 and transmit power from the motor 28 to the spindle 14.

Since the spindle 14 and chuck 12 are driven solely by the motor 28, the motor 28 must have the capacity to drive the chuck 12 at the desired operating speed and with sufficient power to carry out the heaviest anticipated machining operations. Regardless of the power output capacity for the motor 28, there is a significant time lag that occurs in bringing the motor 28 up to speed from a stopped state. There is a further time lag in transmitting power between the pulleys 32, 34, by reason of the non-rigid interconnection therebetween. Accordingly, with the motor 28 stopped and the spindle 14 and chuck 12 at rest, a significant startup time is inherent in the assembly 10, regardless of the power output of the motor 28.

Figure 2:
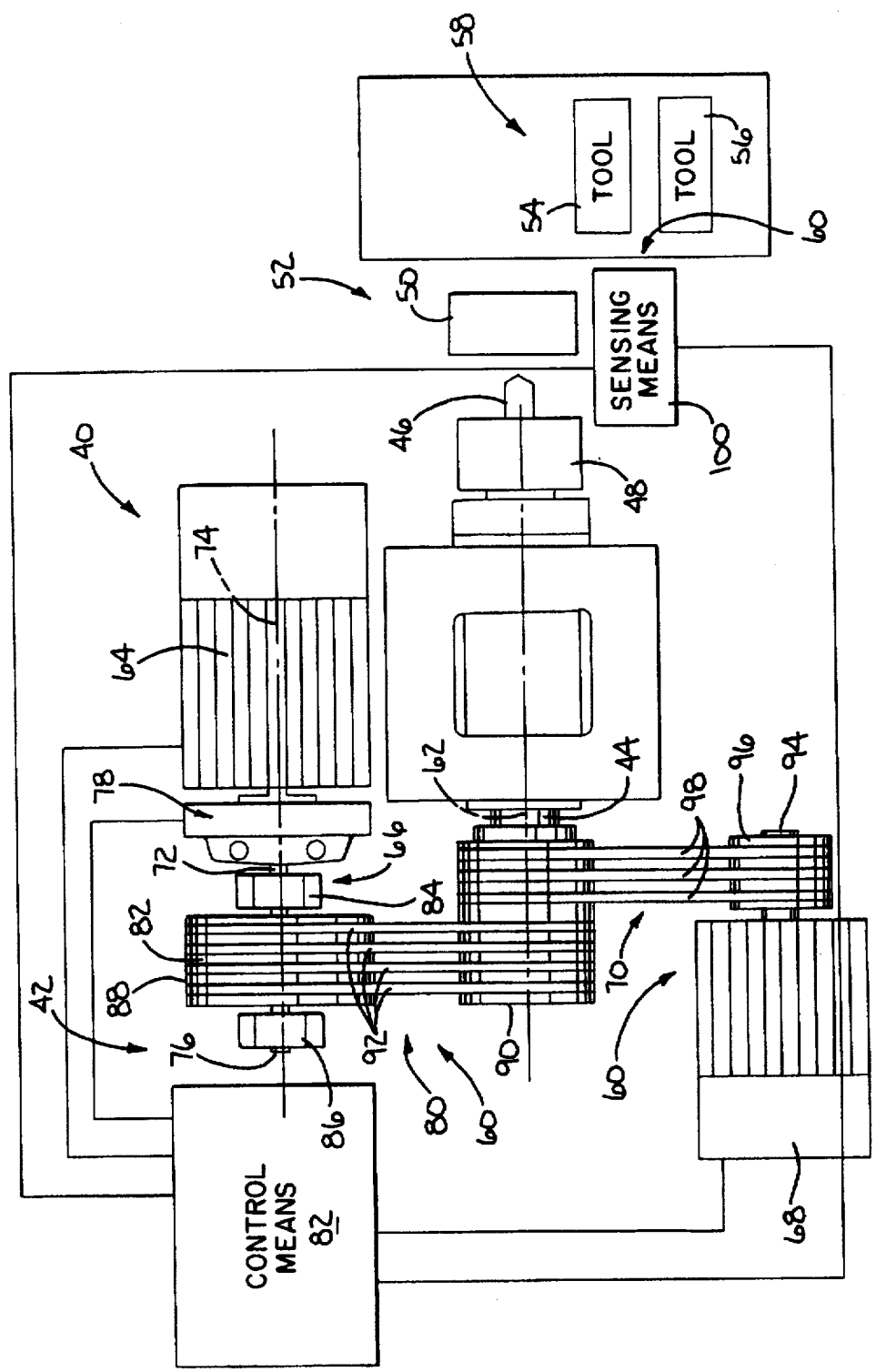
FIG. 2 is a plan view of a machine tool assembly according to the present invention.

A machine tool, according to the present invention, is shown at 40 in FIG. 2. The machine tool assembly 40 is part of an overall system at 42, which may be a single station or multi-station machine tool system.

The machine tool assembly 40 has a rotatable spindle 44 for driving a tool, in this case a drill bit 46, which is releasably carried in a chuck 48 at the end of the spindle 44.

The machine tool assembly could be part of a lathe, or other type of machine tool using a rotatable spindle.

The spindle 44 is driven to cause the tool 46 to perform a desired operation on a workpiece 50 supported at a work station 52.

The tool 46 can be used to perform multiple operations on each individual workpiece 50. Alternatively, workpieces 50 can be serially shuttled into working/operating position, as shown for the workpiece 50, at the work station 52.

Additional machining operations can be performed by tools 54, 56, carried on a gang tool slide 58. The individual tools 54, 56 can be manually placed in, and removed from, the chuck 48. Alternatively, systems well known to those skilled in the art are in existence which automatically effect interchange of the tools. However, again this structure is peripheral to the inventive concept.

Means 60 is provided for driving the spindle 44 in rotation about its axis 62. The means 60 includes a first power source/motor 64 with first means at 66 cooperating between the motor 64 and spindle 44 for transmitting power from the motor 64 as a rotary drive force to the spindle 44.

The means 60 includes a second power source/motor with means at 70 cooperating between the motor 68 and spindle 44 for causing the motor 68 to drive the spindle 44 in rotation about its axis 62.

The motor 64 is preferably a 20–30 h.p. general purpose inverter motor. The motor 64 has a two-part shaft 72 with first and second axially spaced parts 74, 76, respectively, operatively connected through a clutch mechanism at 78. The clutch mechanism 78, which is also part of the means 66, has engaged and disengaged states. In the disengaged state, the motor 64 can be operated without transmitting a rotative force to the spindle 44. In the engaged state, power from the motor is positively transmitted through the shaft parts 74, 76 and through a belt and pulley arrangement at 80 to the spindle 44.

The clutch mechanism 78 is changed between engaged and disengaged positions by a control means 82. The clutch mechanism 78 may be an automotive-type clutch. The clutch currently being used on the Toyota Corolla model automobile would adequately perform the function described herein.

The shaft part 76 carries two axially spaced fly wheels 84, 86 and a pulley 88 therebetween. The pulley 88 is axially aligned with a pulley 90 on the spindle 44. A plurality of axially spaced belts 92 are trained around the pulleys 88, 90 and transfer power from the pulley 88, driven by the motor 64, to the pulley 90, and in turn the spindle 44 on which it is mounted.

The motor 68, which is preferably a 10 h.p. vector motor, has a rotary shaft 94 that carries a pulley 96. The pulley 90 has a sufficient axial extent to align with the pulley 96 to allow, in this case, three axially spaced, endless power transmission belts 98 to be trained around the pulleys 90, 96, to allow power transmission from the pulley 96 to the pulley 90, and in turn to the spindle 44 which carries the pulley 90.

The control means 82 is operatively connected to the motors 64, 68, the clutch 78, and to a means at 100 for sensing the position of a workpiece 50 at the work station 52.

A typical operation of the machine tool assembly 40 will now be described. Initially, the machine tool assembly 40 is in a state wherein the clutch 78 is disengaged. The control means 82 causes the motor 64 to be powered until it reaches its normal operating speed.

With a tool 46 in the chuck 48 and a workpiece 50 in an operating position at the work station 52, a sensing means 100 produces a "completion of part loading" signal to the control means 82 which gives a "spindle start" command that causes the motor 68 to be started and at the same time causes the clutch 78 to be placed in its engaged state. Whereas use of the motor 68 alone would cause a significant time to pass between initial startup and the realization of the operating speed for the spindle 44, the pre-started motor 64, with the clutch 78 engaged, rapidly causes the spindle 44 to be brought up to a programmed operating speed.

The sensing means 100 may produce another signal indicative of a workpiece moving into and out of an operating position at the work station 52. This signal causes the clutch mechanism 78 to remain disengaged, the motor 64 to be brought up to a programmed speed, and the motor 68 to be stopped.

To further minimize this response time, fly wheels 84, 86 are provided on the shaft part 76 to produce additional momentum which is transferred to the pulley 90 and associated spindle 44.

With this arrangement, it can be seen that the spindle 44 can be rapidly brought up to speed. At the same time, the system benefits from the combined power of the motors 64, 68. By placing the clutch 78 in a disengaged state, the smaller motor 68 can be operated alone with the pulley 98 idling. This results in an energy savings.

The resulting system has flexibility from a power standpoint and also can, in most cases, be constructed more cheaply than the same system with a single 40 h.p. motor.

The foregoing disclosure of specific embodiments is intended to be illustrative of the broad concepts comprehended by the invention.

We claim:

1. A machine tool assembly comprising:

a rotatable element for driving a tool to operate on a workpiece;

means for driving the rotatable element in rotation, said driving means comprising a first power source and first means cooperating between the first power source and the rotatable tool driving element for selectively a) allowing the first power source to be operated at one speed to drive the rotatable tool driving element at a first operating speed with the machine tool assembly in a first state and b) allowing the first power source to be operated at the one speed without rotating the rotatable tool driving element at the first operating speed with the machine tool assembly in a second state, said driving means further comprising a second power source and second means cooperating between the second power source and the rotatable tool driving element for driving the rotatable tool driving element at a second operating speed both with the machine tool assembly in the first state and the machine tool in the second state; and means for changing the machine tool assembly from one of its first and second states to the other of its first and second states.

2. A machine tool assembly comprising:

a rotatable element for driving a tool to operate on a workpiece;

means for driving the rotatable element in rotation, said driving means comprising a first power source, first means cooperating between the first power source and the rotatable tool driving element for driving the rotatable tool driving element through the first power source at a first operating speed, a second power source, and second means cooperating between the second power source and rotatable driving element for driving the rotatable tool driving element through the second power source at a second operating speed, said first cooperating means including means for selectively placing the machine tool assembly in a) a first state wherein the first power source operating at one speed drives the rotatable tool driving element at a first operating speed and b) a second state wherein the rotatable tool driving element is undriven by the first power source with the first power source operating at the one speed; and control means for selectively c) causing operation of the first power source at the one speed without causing operation of the second power source with the machine tool assembly in the second state and d) causing operation of both the first and second power sources with the machine tool assembly in the first state.

3. The machine tool assembly of claim 1 wherein the first and second power sources comprise motors having different power output capacities.

4. The machine tool assembly of claim 1 wherein the first cooperating means includes a clutch assembly having engaged and disengaged states and the clutch assembly is in the engaged state with the machine tool assembly is in its first state and the clutch assembly is in its disengaged state with the machine tool assembly is in its second state.

5. A machine tool assembly comprising:

a rotatable element for driving a tool to operate on a workpiece;

means for driving the rotatable element in rotation, said driving means comprising a first power source and first means cooperating between the first power source and the rotatable tool driving element for selectively a) allowing the first power source to be operated at one speed to drive the rotatable tool driving element at a first operating speed with the machine tool assembly in a first state and b) allowing the power source to be operated at the one speed without rotating the rotatable tool driving element at the first operating speed with the machine tool assembly in a second state, the driving means further comprising a motor with a rotary shaft, and the first cooperating means comprising a pulley on the rotary shaft, at least one power transmission belt for transmitting power from the pulley to the rotatable tool driving element, and means for selectively a) allowing the first power source to be operated at the one speed without rotating the pulley and b) allowing the first power source to be operated at the one speed to drive the pulley; and means for changing the machine tool assembly from one of its first and second states to the other of its first and second states.

6. The machine tool assembly of claim 5 wherein there is a flywheel on the rotary shaft.

7. A machine tool assembly comprising:

a working tool for operating on a workpiece;

a rotatable element for driving the working tool to operate on a workpiece;

means cooperating between the working tool and the rotatable tool driving element for rotating the working tool as an incident of the rotatable tool driving element being rotated;

means for driving the rotatable element in rotation, said driving means comprising a first power source and first means cooperating between the first power source and the rotatable tool driving element for selectively a) allowing the first power source to be operated at one speed to drive the rotatable tool driving element at a first operating speed with the machine tool assembly in a first state and b) allowing the power source to be operated at the one speed without rotating the rotatable tool driving element at the first operating speed with the machine tool assembly in a second state;

means for changing the machine tool assembly from one of its first and second states to the other of its first and second states; and control means for operating the driving means, said control means including means for sensing the location of a workpiece in an operating position at a work station and for producing a signal indicative of a workpiece being in an operating position at a work station, said control means including means responsive to the signal from the sensing means for changing the machine tool from its second state into its first state.

8. The machine tool assembly of claim 7 wherein the driving means includes a second power source and second means cooperating between the second power source and the rotatable tool driving element for driving the rotatable tool driving element at a second operating speed with the machine tool assembly in at least one of the first and second states and the control means includes means responsive to the signal from the sensing means for operating the second power source.

9. The machine tool assembly of claim 1 wherein the rotatable tool driving element comprises a spindle having a chuck for receiving a working tool.

10. The machine tool assembly of claim 8 wherein the control means includes means for generating another signal indicative of a workpiece at least one of a) moving into an operating position and b) moving out of an operating position and means responsive to the another signal for changing the machine tool from its first state into its second state.

11. The machine tool assembly of claim 10 wherein the second power source has an operating state and a stopped state and the control means includes means responsive to the another signal for changing the second power source from its operating state to its stopped state.

12. The machine tool assembly according to claim 2 wherein the rotatable tool driving element comprises a spindle with a chuck for a working tool.

13. The machine tool assembly according to claim 2 wherein the first and second power sources comprise motors having different power output capacities.

14. The machine tool assembly according to claim 13 wherein the control means includes means for sensing the location of a workpiece in an operating position at a work station and for producing a signal indicative of a workpiece being in an operating position at a work station, said control means including means responsive to the signal from the sensing means for causing the machine tool assembly to change from the second state into the first state.

15. The machine tool assembly according to claim 14 wherein the control means includes means responsive to the signal from the sensing means for operating the second power source.

16. The machine tool assembly according to claim 14 wherein the means for causing the machine tool assembly to change from the second state into the first state comprises means for causing the machine tool assembly to change from the second state into the first state with the first power source operating at a predetermined speed.

17. The machine tool assembly according to claim 2 wherein the means for selectively placing the machine tool assembly in the first state comprises a clutch mechanism.

18. The machine tool assembly according to claim 2 wherein the rotatable tool driving element comprises a rotatable shaft and the first and second cooperating means each include first and second endless power transmission elements driven one each by the first and second power sources and each operatively connected to the rotatable shaft.

19. The machine tool assembly according to claim 2 wherein the first power source comprises a motor with a rotary shaft and there is a flywheel on the rotary shaft.

* * * * *